(12) United States Patent
Abe et al.

(10) Patent No.: US 10,116,945 B2
(45) Date of Patent: Oct. 30, 2018

(54) MOVING PICTURE ENCODING APPARATUS AND MOVING PICTURE ENCODING METHOD FOR ENCODING A MOVING PICTURE HAVING AN INTERLACED STRUCTURE

(71) Applicant: Panasonic Intellectual Property Management Co., Ltd., Osaka (JP)

(72) Inventors: Kiyofumi Abe, Osaka (JP); Hideyuki Ohgose, Osaka (JP); Shinji Kitamura, Kyoto (JP); Takashi Hashimoto, Hyogo (JP); Toshihiko Kusakabe, Osaka (JP); Yuki Maruyama, Osaka (JP); Tatsuro Juri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 111 days.

(21) Appl. No.: 15/298,603

(22) Filed: Oct. 20, 2016

(65) Prior Publication Data

US 2017/0251215 A1    Aug. 31, 2017

(30) Foreign Application Priority Data

Feb. 26, 2016  (JP) .................................. 2016-036305
Oct. 7, 2016   (JP) .................................. 2016-199348

(51) Int. Cl.
| H04N 19/174 | (2014.01) |
| H04N 19/196 | (2014.01) |
| H04N 19/159 | (2014.01) |
| H04N 19/115 | (2014.01) |

(52) U.S. Cl.
CPC ......... *H04N 19/174* (2014.11); *H04N 19/115* (2014.11); *H04N 19/159* (2014.11); *H04N 19/196* (2014.11)

(58) Field of Classification Search
CPC .. H04N 19/115; H04N 19/159; H04N 19/174; H04N 19/196
See application file for complete search history.

(56) References Cited

U.S. PATENT DOCUMENTS

2004/0264570 A1* 12/2004 Kondo .................. H04N 19/70
                                                     375/240.16
2012/0008685 A1*  1/2012 Sasaki ................. H04N 19/105
                                                     375/240.13
2015/0003531 A1   1/2015 Sato

FOREIGN PATENT DOCUMENTS

JP        2013-121020        6/2013

OTHER PUBLICATIONS

Recommendation ITU-T H.265, High efficiency video coding, Apr. 2013.

* cited by examiner

*Primary Examiner* — Jessica M Prince
(74) *Attorney, Agent, or Firm* — Wenderoth, Lind & Ponack, L.L.P.

(57) ABSTRACT

A moving picture encoding apparatus encodes a moving picture having an interlaced structure, and includes: a storage which stores fields as reference pictures; and an encoder which encodes a current field as a B-picture, using a first reference picture list which includes only one field in a same parity as the current field, and a second reference picture list which includes only one field in an opposite parity to the current field.

4 Claims, 14 Drawing Sheets

MOVING PICTURE ENCODING APPARATUS AND MOVING PICTURE ENCODING METHOD FOR ENCODING A MOVING PICTURE HAVING AN INTERLACED STRUCTURE

CROSS REFERENCE TO RELATED APPLICATIONS

This application claims the benefit of priority of Japanese Patent Application Number 2016-036305 filed on Feb. 26, 2016 and Japanese Patent Application Number 2016-199348 filed on Oct. 7, 2016, the entire contents of which are hereby incorporated by reference.

BACKGROUND

1. Technical Field

The present disclosure relates to a moving picture encoding apparatus which encodes a moving picture having an interlaced structure.

2. Description of the Related Art

Japanese Unexamined Patent Application Publication No. 2013-121020 relates to an image processing apparatus and an image processing method for improving encoding efficiency, in encoding or decoding a motion vector when an input is an interlaced signal.

In Japanese Unexamined Patent Application Publication No. 2013-121020, for example, a PU and a reference PU referred to for motion vector information of the PU belongs to a top field. Nevertheless, a co-located PU belongs to the top field while a reference PU referred to for motion vector information of the co-located PU belongs to a bottom field. Accordingly, a phase shift between the top field and the bottom field occurs. Thus, a parity adjustor adjusts and makes −½ shift on a vertical component of the motion vector information of the co-located PU.

SUMMARY

The present disclosure provides, for instance, a moving picture encoding apparatus which can efficiently encode a moving picture having the interlaced structure.

A moving picture encoding apparatus according to the present disclosure is a moving picture encoding apparatus which encodes a moving picture having an interlaced structure, the moving picture encoding apparatus including: a storage which stores fields as reference pictures; and an encoder which encodes a current field as a B-picture, using a first reference picture list which includes only one field in a same parity as the current field, and a second reference picture list which includes only one field in an opposite parity to the current field.

A moving picture encoding apparatus, for instance, according to the present disclosure can efficiently encode a moving picture having the interlaced structure.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

The following describes embodiments in detail, with reference to the drawings as appropriate. However, an unnecessarily detailed description may be omitted. For example, a detailed description of a matter already known well and a redundant description of the substantially same configuration may be omitted. This is intended to avoid making the following description unnecessarily redundant and to facilitate understanding of a person skilled in the art.

Note that the inventors of the present application provide the accompanying drawings and the following description in order that persons skilled in the art sufficiently understand the present disclosure, and thus do not intend to limit the disclosed subject matter of the claims by these.

In the following description, the ordinal numbers such as first, second, and third may be changed, omitted, or newly given, as appropriate.

Furthermore, in the following description, an I-picture, a P-picture, a B-picture, and an instantaneous decoding refresh (IDR) picture basically each indicate the attribute or type of a picture. Nevertheless, an I-picture, a P-picture, a B-picture, and an IDR picture may each indicate a picture itself corresponding to the attribute and type.

In the following description, a top field and a bottom field basically each indicate the attribute or type of the field. However, a top field and a bottom field may each indicate a field itself corresponding to the attribute and type.

Embodiment 1

The following describes Embodiment 1 with reference to FIGS. 1 to 15.

[1-1. Configuration]

Figure 1:
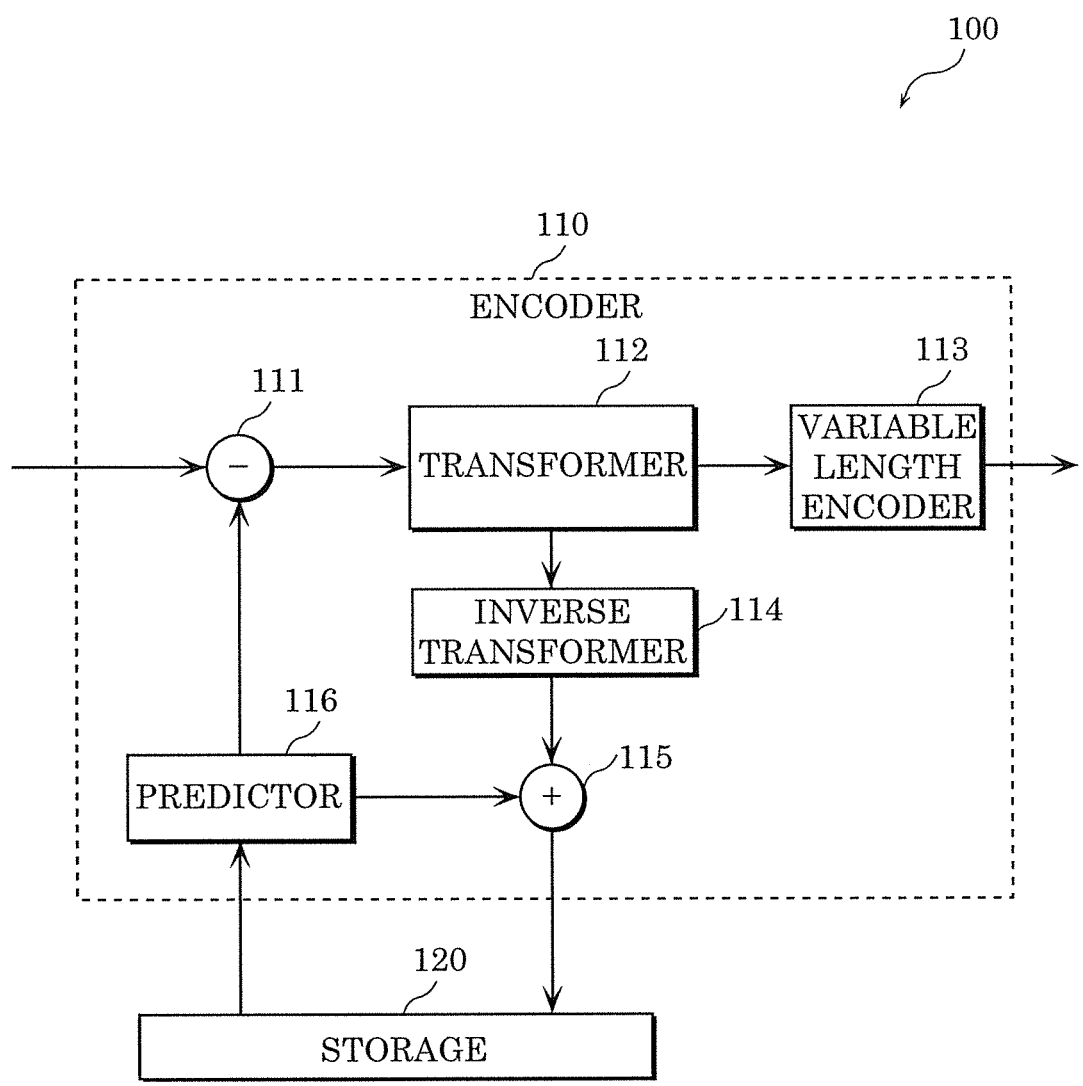
FIG. 1 is a block diagram illustrating a configuration of a moving picture encoding apparatus according to Embodiment 1.

FIG. 1 is a block diagram illustrating a configuration of a moving picture encoding apparatus according to Embodiment 1. Moving picture encoding apparatus 100 illustrated in FIG. 1 includes encoder 110 and storage 120. Encoder 110 includes subtractor 111, transformer 112, variable length encoder 113, inverse transformer 114, adder 115, and predictor 116.

Moving picture encoding apparatus 100 encodes a moving picture. Specifically, in moving picture encoding apparatus 100, encoder 110 encodes a plurality of pictures included in a moving picture, in accordance with a moving picture encoding standard such as Advanced Video Coding (AVC) or High Efficiency Video Coding (HEVC). Encoder 110 encodes a current picture block-by-block.

When encoder 110 encodes a current picture block-by-block, predictor 116 generates a predicted image block for an original image block in the current picture by intra prediction or inter prediction. Subtractor 111 generates a difference image block by subtracting the predicted image block from the original image block in the current picture. Transformer 112 generates a coefficient block by converting the difference image block into a frequency component and quantizing the frequency component.

Variable length encoder 113 generates an encoded block by performing variable length encoding on the coefficient block. Inverse transformer 114 generates a difference image block by performing inverse quantization on the coefficient block and converting the resultant block into a pixel component. Adder 115 generates a reconstructed image block by adding the predicted image block to the difference image block. Filter processing for reducing block distortion may be applied to the reconstructed image block.

Encoder 110 generates a reconstructed picture which includes reconstructed image blocks generated for the current picture, and stores the reconstructed picture into storage 120, as a reference picture to be used for inter prediction. For example, when encoder 110 encodes a subsequent current picture, predictor 116 generates a predicted image block for an original image block in the subsequent current picture, by performing inter prediction with reference to a reference picture stored in storage 120.

Pictures included in a moving picture are each classified into one of an I-picture, a P-picture and a B-picture. I-picture, P-picture, and B-picture are also referred to as picture types.

For an I-picture, inter prediction is prevented from being performed on blocks. For a P-picture, inter prediction is allowed to be performed on each block, and one reference picture can be referred to for one block. For a B-picture, inter prediction is allowed to be performed on each block, and a maximum of two reference pictures can be referred to for one block.

Specifically, if a current picture to be encoded is an I-picture, encoder 110 performs intra prediction on each block of the current picture, and encodes the current picture. If a current picture to be encoded is a P-picture, encoder 110 encodes the current picture using one reference picture list. If a current picture to be encoded is a B-picture, encoder 110 encodes the current picture using two reference picture lists.

One or more reference pictures are included in each reference picture list. The reference picture lists may be referred to as reference lists. For example, if a current picture to be encoded is a P-picture, encoder 110 may select, for each block, a reference picture to be referred to in inter prediction, from among a plurality of reference pictures included in one reference picture list.

If a current picture to be encoded is a B-picture, encoder 110 may select, for each block, a reference picture to be referred to in inter prediction, from among a plurality of reference pictures included in the two reference picture lists. In this case, encoder 110 may select two reference pictures for one block, by selecting one reference picture from each of the two reference picture lists. For example, encoder 110 may perform bidirectional prediction for one block, with reference to two reference pictures.

Two reference picture lists are denoted by L0 and L1. For example, if a current picture to be encoded is a P-picture, only one reference picture list L0 is used among two reference picture lists L0 and L1. If a current picture to be encoded is a B-picture, two reference picture lists L0 and L1 are used.

Storage 120 stores a plurality of reference pictures. Reference pictures stored in storage 120 are to be used for inter prediction, and are reconstructed pictures for encoded pictures. When encoder 110 encodes an original image block in a current picture using inter prediction, predictor 116 generates a predicted image block by predicting the original image block with reference to a reference picture.

Moving picture encoding apparatus 100 encodes a moving picture having an interlaced structure, in particular. A moving picture having an interlaced structure includes a plurality of fields each classified into a top field and a bottom field. Encoder 110 encodes each field as a picture. Then, the fields are stored in storage 120 as reference pictures. In other words, a picture in the above description may be a field.

Figure 2:
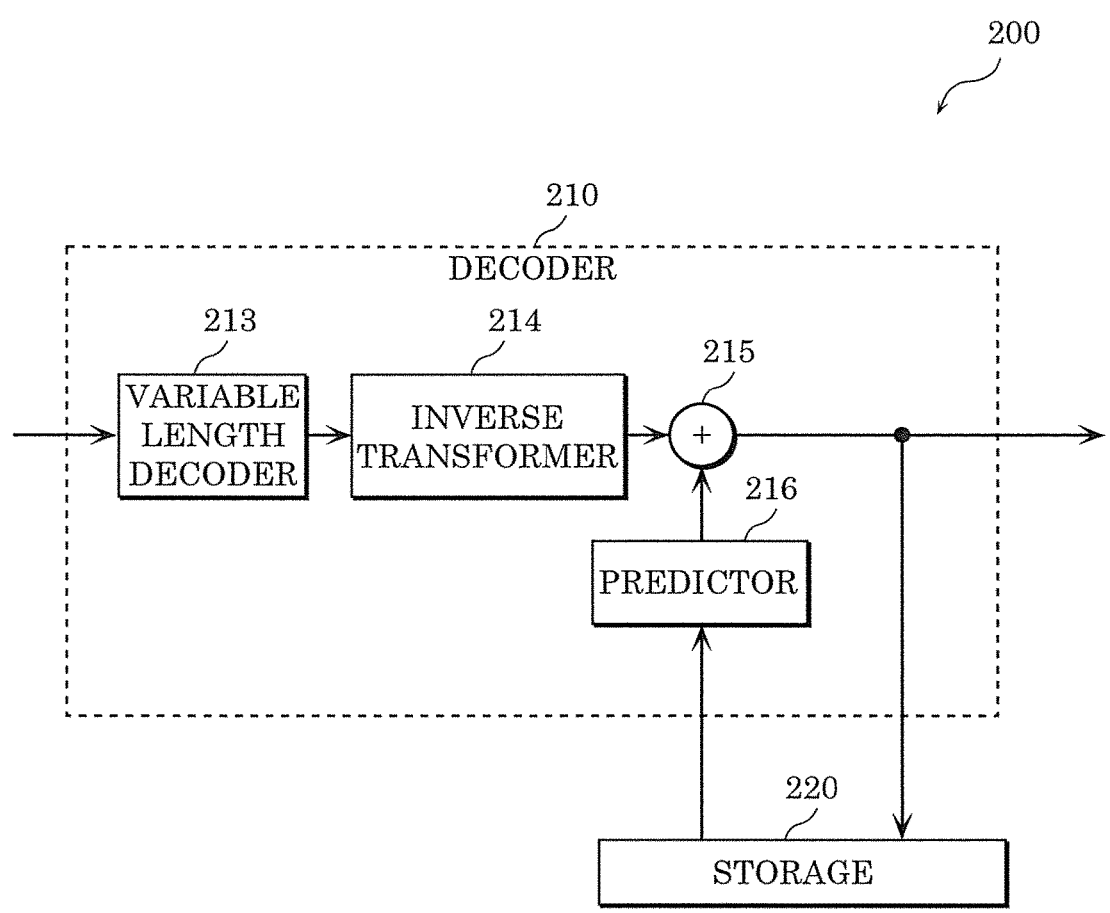
FIG. 2 is a block diagram illustrating a configuration of a moving picture decoding apparatus according to Embodiment 1.

FIG. 2 is a block diagram illustrating a configuration of a moving picture decoding apparatus corresponding to moving picture encoding apparatus 100 illustrated in FIG. 1. Moving picture decoding apparatus 200 illustrated in FIG. 2 includes decoder 210 and storage 220. Decoder 210 includes variable length decoder 213, inverse transformer 214, adder 215, and predictor 216.

Moving picture decoding apparatus 200 decodes a moving picture. Specifically, in moving picture decoding apparatus 200, decoder 210 decodes a plurality of pictures included in a moving picture in accordance with a moving picture encoding standard such as AVC or HEVC. Decoder 210 decodes a current picture block-by-block.

When decoder 210 decodes a current picture block-by-block, variable length decoder 213 generates a coefficient block by performing variable-length decoding on an encoded block. Inverse transformer 214 generates a difference image block by performing inverse quantization on the coefficient block and converting the resultant block into a pixel component.

Predictor 216 generates a predicted image block by intra prediction or inter prediction. Adder 215 generates a reconstructed image block by adding the predicted image block to the difference image block. Filter processing for reducing block distortion may be applied to the reconstructed image block.

Decoder 210 generates a reconstructed picture which includes a plurality of reconstructed image blocks generated for the current picture, and outputs the reconstructed picture as a decoded picture.

Decoder 210 stores the reconstructed picture into storage 220 as a reference picture to be used for inter prediction. For example, when a subsequent current picture is decoded, predictor 216 generates a predicted image block for a current image block to be decoded in the subsequent current picture, by performing inter prediction with reference to a reference picture stored in storage 220.

Storage 220 stores a plurality of reference pictures, as with storage 120 of moving picture encoding apparatus 100. A reference picture stored in storage 220 is a picture to be used for inter prediction, and is a reconstructed picture equivalent to a decoded picture. When decoder 210 decodes a current image block within a current picture to be decoded using inter prediction, predictor 216 generates a predicted image block by predicting the current image block using a reference picture.

Moving picture decoding apparatus 200 corresponds to moving picture encoding apparatus 100, and decodes a moving picture having an interlaced structure, in particular. Decoder 210 decodes, as a picture, each of a plurality of fields included in a moving picture. Each field is stored as a reference picture in storage 220. A picture in the above description with regard to moving picture decoding apparatus 200 may be a field.

Figure 3:
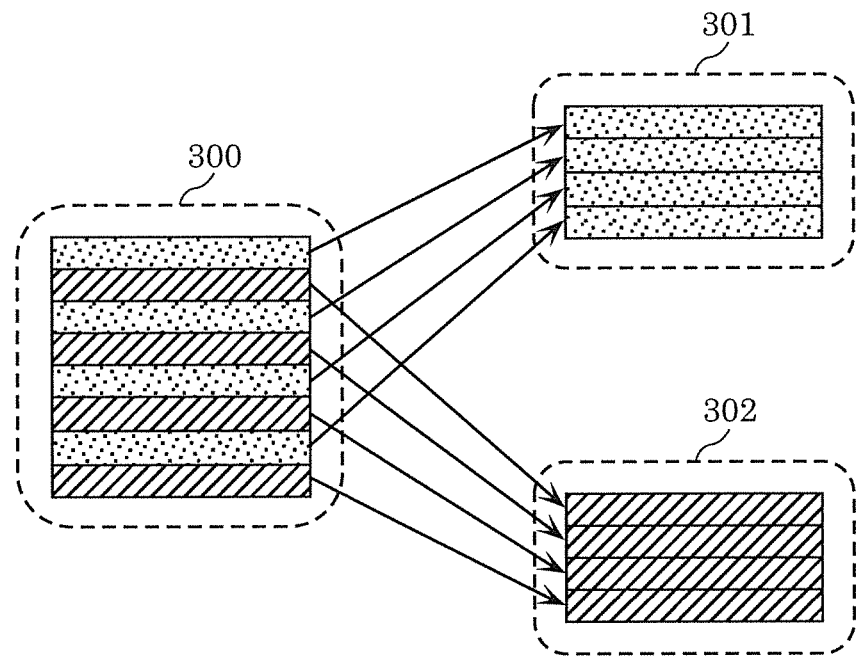
FIG. 3 is a conceptual diagram illustrating fields according to Embodiment 1.

FIG. 3 is a conceptual diagram illustrating fields. For example, one pair of fields 301 and 302 are included in one frame 300.

Field 301 and field 302 are vertically shifted by 1 pixel. Among the one pair of fields 301 and 302, field 301 corresponds to an upper field and is classified into a top field. Among the one pair of fields 301 and 302, field 302 corresponds to a lower field, and is classified into a bottom field.

Field 301 and field 302 are each encoded as one picture.

Figure 4:
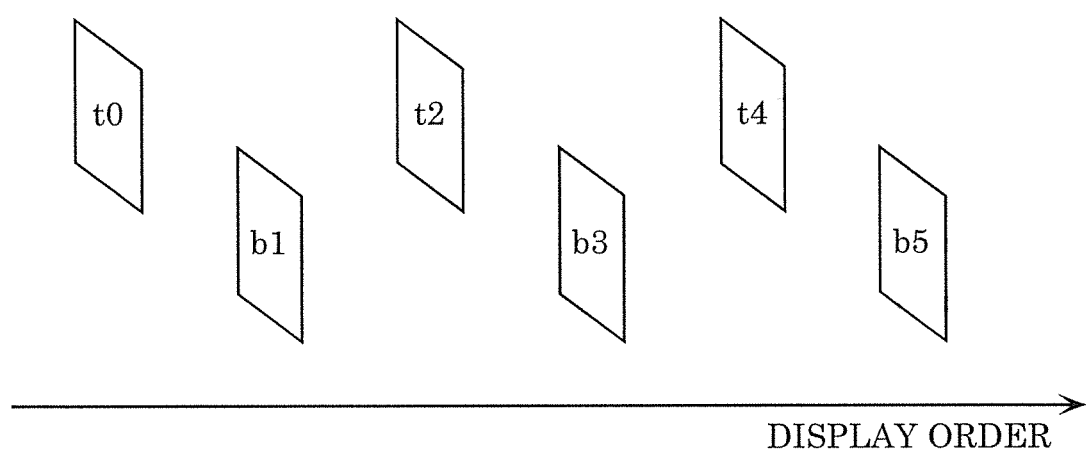
FIG. 4 is a conceptual diagram illustrating display order of fields according to Embodiment 1.

FIG. 4 is a conceptual diagram illustrating display order of fields. In an example of FIG. 4, fields t0, t2, and t4 belong to a top field, and fields b1, b3, and b5 belong to a bottom field. Fields t0, b1, t2, b3, t4, and b5 are displayed in order. In other words, a top field and a bottom field are displayed alternately. In this manner, motion is displayed smoothly.

Note that the display order of fields included in a moving picture having an interlaced structure basically corresponds to the order in which the fields are imaged, and corresponds to the input order which is an order in which fields are input to moving picture encoding apparatus 100. With regard to the order of fields, a temporally past direction corresponds to forward, and a temporally future direction corresponds to backward.

If both two fields belong to the top field or the bottom field, the two fields have a same-parity relationship. In this case, one field is represented as being in the same parity as the other field.

Among the two fields, if one belongs to the top field and the other belongs to the bottom field, or if one belongs to the bottom field and the other belongs to the top field, the two fields have an opposite-parity relationship. In this case, one field is represented as being in an opposite parity to the other field.

Same parity and opposite parity may be represented by inphase and antiphase, respectively.

[1-2. Operation]

The following describes operation of, for instance, moving picture encoding apparatus 100 illustrated in FIG. 1. Note that the following basically describes operation of moving picture encoding apparatus 100. Moving picture decoding apparatus 200 performs operation corresponding to the operation of moving picture encoding apparatus 100.

In the following, a picture being encoded or decoded with reference to another picture may be represented as a picture referring to another picture.

Figure 5:
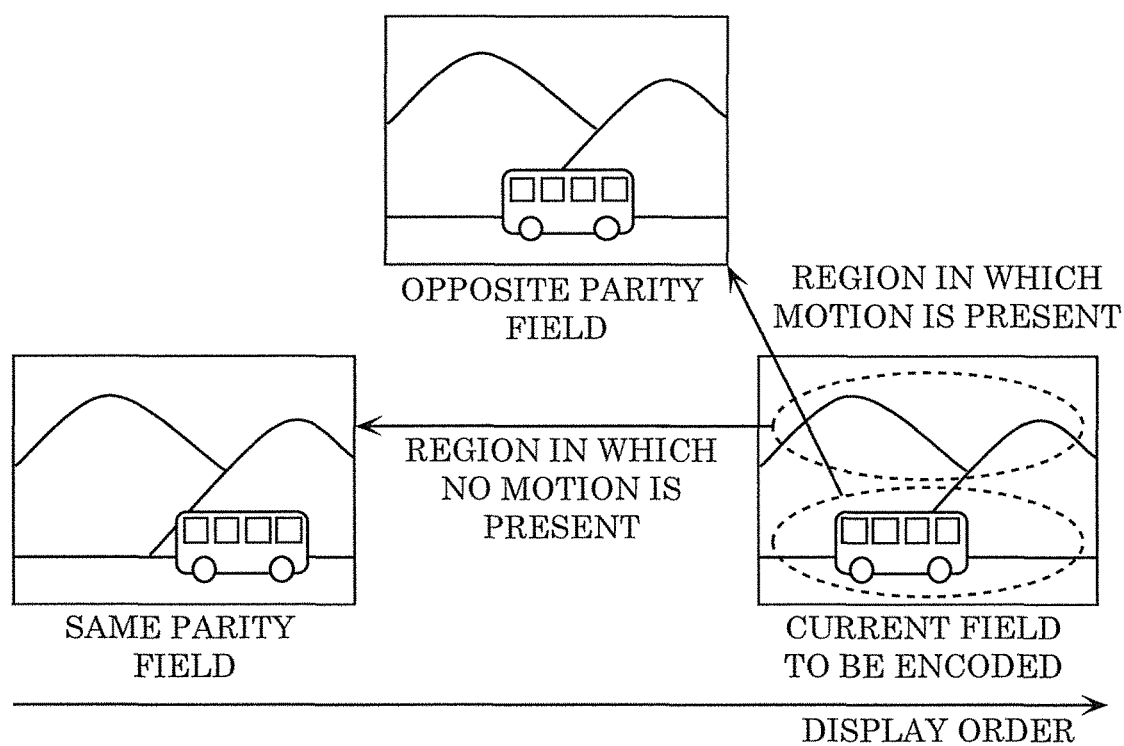
FIG. 5 is a conceptual diagram illustrating reference of fields according to Embodiment 1.

FIG. 5 is a conceptual diagram illustrating reference of fields. For example, if there is no motion, a current field is encoded with reference to a same parity field in the same position as the current field. Accordingly, the accuracy of prediction improves and encoding efficiency improves. On the other hand, if there is motion, a current field is encoded with reference to a field in an opposite parity to and temporally near the current field. Accordingly, the accuracy of prediction improves and encoding efficiency improves.

However, a current field t0 be encoded may include a region in which no motion is present and a region in which motion is present. In view of this, encoder 110 of moving picture encoding apparatus 100 illustrated in FIG. 1 switches, for each block of such a current field t0 be encoded, a reference destination between a same parity field and an opposite parity field. Specifically, encoder 110 refers to a same parity field when encoder 110 encodes a block in a region where no motion is present. When encoder 110 encodes a block in a region in which motion is present, encoder 110 refers to an opposite parity field.

In this manner, encoder 110 can improve, for both a region in which no motion is present and a region in which motion is present. Consequently, the accuracy of prediction improves and encoding efficiency improves.

Figure 6:
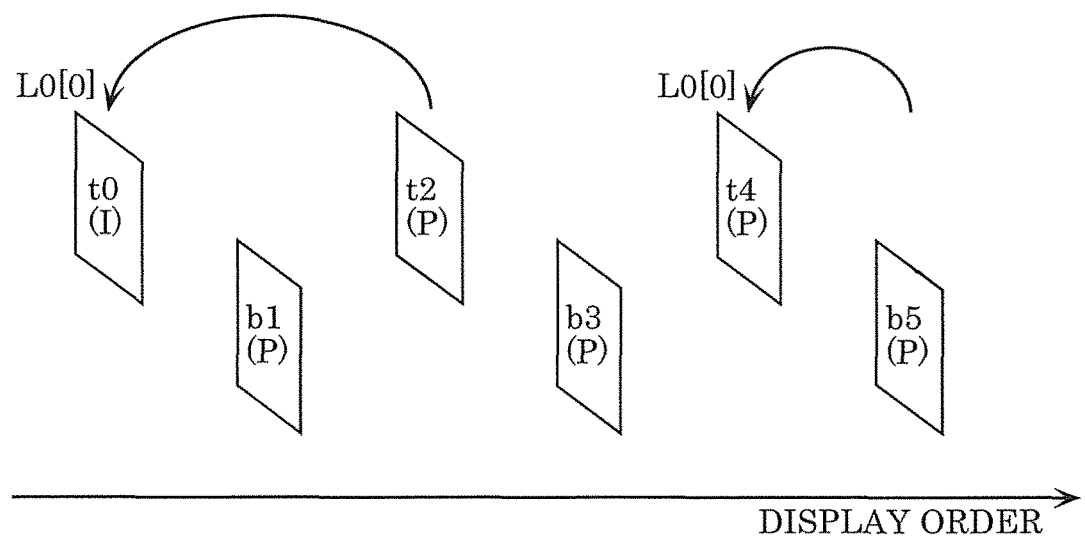
FIG. 6 is a conceptual diagram illustrating reference relationships between fields in a first reference example.

FIG. 6 is a conceptual diagram illustrating reference relationships between fields in a first reference example. FIG. 6 illustrates fields t0, b1, t2, b3, t4, and b5 in display order (input order). Fields t0, t2, and t4 belong to the top field, and fields b1, b3, and b5 belong to the bottom field.

Field t0 is encoded as an I-picture, and fields b1, t2, b3, t4, and b5 are each encoded as a P-picture. Fields t0, b1, t2, b3, t4, and b5 may constitute one group of pictures (GOP).

In the example in FIG. 6, reference picture list L0 which includes field t0 in the same parity as field t2 is used when field t2 is encoded as a P-picture. When field b5 is encoded as a P-picture, reference picture list L0 which includes field t4 in the opposite parity to field b5 is used. In this manner, field t2 in which no motion is present and field b5 in which motion is present can be encoded efficiently.

However, it is difficult to efficiently encode, using reference picture list L0 which includes either a same parity or an opposite parity field, a field which includes both a region in which no motion is present and a region in which motion is present.

Note that L0[0] in, for instance, FIG. 6 indicates reference index 0 of reference picture list L0. A reference index is an index for identifying a reference picture included in a reference picture list. The example in FIG. 6 shows that in encoding field t2, field t0 is included in reference picture list L0, and reference index 0 is assigned to field t0. Encoding field b5 shows that field t4 is included in reference picture list L0, and reference index 0 is assigned to field t4.

Figure 7:
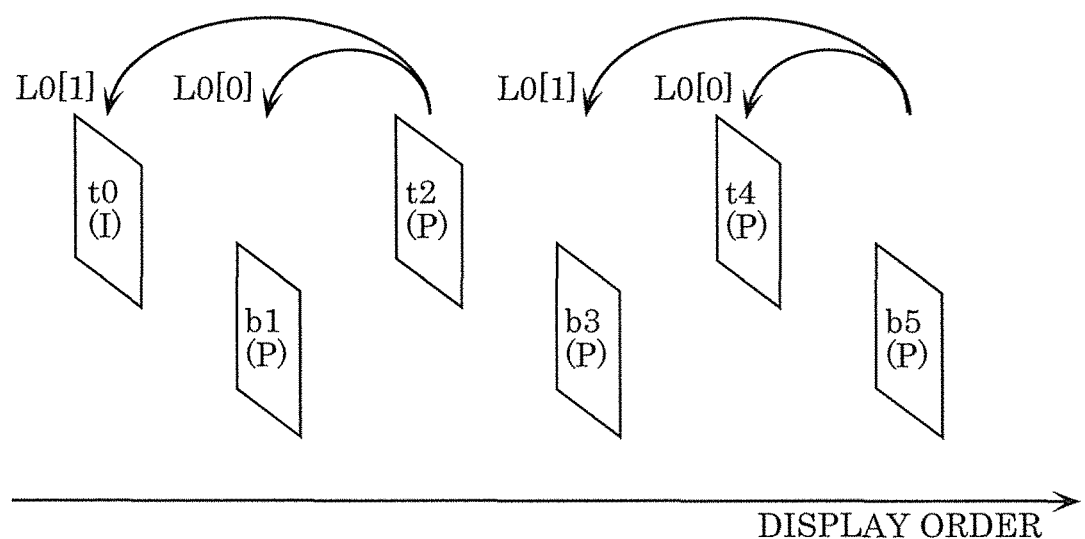
FIG. 7 is a conceptual diagram illustrating reference relationships between fields in a second reference example.

FIG. 7 is a conceptual diagram illustrating reference relationships between fields in a second reference example. FIG. 7 illustrates fields t0, b1, t2, b3, t4, and b5 in display order (input order), as with FIG. 6. Fields t0, t2, and t4 belong to the top field, and fields b1, b3, and b5 belong to the bottom field.

As with FIG. 6, field t0 is encoded as an I-picture, and fields b1, t2, b3, t4, and b5 are encoded as P-pictures. Fields t0, b1, t2, b3, t4, and b5 may constitute one GOP.

In the example in FIG. 7, reference picture list L0 which includes field t0 in the same parity as field t2 and field b1 in the opposite parity to field t2 is used to encode field t2 as a P-picture. The reference destination is switched between field t0 and field b1 for each of blocks in field t2, and accordingly field t2 is encoded. In this manner, even if field t2 includes both a region in which no motion is present and a region in which motion is present, field t2 is encoded efficiently.

In the example in FIG. 7, in encoding field t2, reference index 1 is assigned to field t0, and reference index 0 is assigned to field hi, in order to identify field t0 and field b1 which are included in reference picture list L0. Reference index 0 or 1 is encoded for each block as information indicating the reference destination.

Also in decoding field t2, reference picture list L0 which includes field t0 in the same parity as field t2 and field b1 in the opposite parity to field t2 is used, as with the case of encoding. Reference index 1 is assigned to field t0 and reference index 0 is assigned to field b1, in order to identify field t0 and field b1 which are included in reference picture list L0.

Then, reference index 0 or 1 is decoded for each block as information indicating the reference destination. Then, based on reference index 0 or 1 decoded, the reference destination is switched for each block between field t0 and field b1. In this manner, the same reference destination used for encoding is used in decoding.

For example, reference picture list L0 which includes field b3 in the same parity as field b5 and field t4 in the opposite parity to field b5 is used when field b5 is encoded as a P-picture. Reference index 1 is assigned to field b3, and reference index 0 is assigned to field t4. In this manner, even if field b5 includes both a region in which no motion is present and a region in which motion is present, field b5 is encoded efficiently.

However, in the example of FIG. 7, reference index 0 or 1 is encoded for each block, and thus the amount of encodes may increase. Furthermore, a control circuit for assigning a plurality of fields to one reference picture list may be complicated.

In view of this, moving picture encoding apparatus 100 illustrated in FIG. 1 encodes a current field as a B-picture, using a first reference picture list which includes only one same parity field and a second reference picture list which includes only one opposite parity field.

Figure 8:
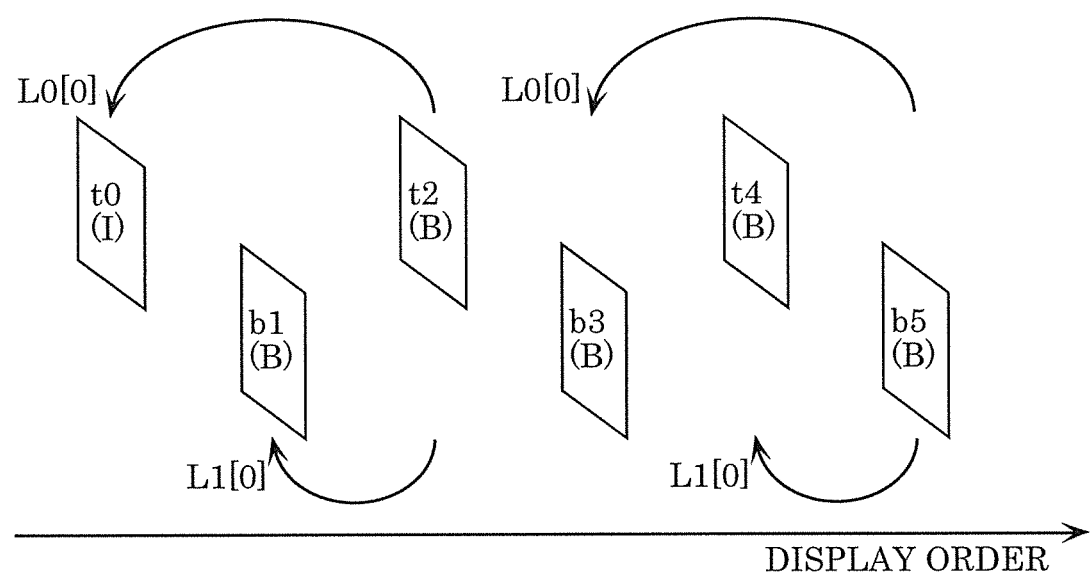
FIG. 8 is a conceptual diagram illustrating examples of reference relationships between fields according to Embodiment 1.

FIG. 8 is a conceptual diagram illustrating examples of reference relationships between fields, which are used by moving picture encoding apparatus 100 illustrated in FIG. 1. FIG. 8 illustrates fields t0, b1, t2, b3, t4, and b5 in display order (input order) as with FIGS. 6 and 7. Fields t0, t2, and t4 belong to the top field, and fields b1, b3, and b5 belong to the bottom field.

In FIG. 8, field t0 is encoded as an I-picture, and fields b1, t2, b3, t4, and b5 are encoded as B-pictures. Fields t0, b1, t2, b3, t4, and b5 may constitute one GOP, as with FIGS. 6 and 7.

For example, encoder 110 in moving picture encoding apparatus 100 adds, to reference picture list L0, field t0 in the same parity as field t2, in encoding field t2. Then, encoder 110 assigns reference index 0 to field t0 of reference picture list L0. Encoder 110 adds, to reference picture list L1, one field b1 in the opposite parity to field t2. Then, encoder 110 assigns reference index 0 to field b1 of reference picture list L1.

Encoder 110 in moving picture encoding apparatus 100 encodes field t2 as a B-picture, using reference picture list L0 which includes only same parity field t0 and reference picture list L1 which includes only opposite parity field b1.

For example, encoder 110 in moving picture encoding apparatus 100 encodes a block in field t2, in which no motion is present, with reference to field t0 included in reference picture list L0. Encoder 110 encodes a block in field t2, in which motion is present, with reference to field b1 included in reference picture list L1.

Accordingly, in encoding field t2, moving picture encoding apparatus 100 can refer to, for a region in field t2 in which no motion is present, same parity field t0, and refer to, for a region in field t2 in which motion is present, opposite parity field b1. Specifically, moving picture encoding apparatus 100 can efficiently encode field t2 by switching, for each block in field t2, the reference destination between field t0 and field b1.

In encoding field t2, for example, encoder 110 in moving picture encoding apparatus 100 encodes information indicating field t0 included in reference picture list L0, and information indicating field b1 included in reference picture list L1. Encoder 110 encodes, for each block in field t2, information indicating a reference picture list used for encoding the block, among reference picture lists L0 and L1.

In decoding field t2, decoder 210 in moving picture decoding apparatus 200 decodes information indicating field t0 included in reference picture list L0 and information indicating field b1 included in reference picture list L1. Decoder 210 adds field t0 to reference picture list L0, and assigns reference index 0 to field t0. Decoder 210 adds field b1 to reference picture list L1, and assigns reference index 0 to field b1.

Decoder 210 in moving picture decoding apparatus 200 decodes field t2 as a B-picture, using reference picture list L0 which includes only same parity field t0, and reference picture list L1 which includes only opposite parity field b1. Decoder 210 decodes, for each block in field t2, information indicating the reference picture list used for encoding the block, among reference picture lists L0 and L1.

In this manner, moving picture decoding apparatus 200 can select, for each block in field t2, the reference picture list used in encoding the block, among reference picture lists L0 and L1. Moving picture decoding apparatus 200 can select, for each block, the field used in encoding the block, among field t0 included in reference picture list L0 and field b1 included in reference picture list L1.

Accordingly, moving picture encoding apparatus 100 switches between field t0 and field b1 and refers to one of the fields without encoding a reference index, in encoding field t2. Moving picture decoding apparatus 200 can select, for each block, the same field as the field referred to by moving picture encoding apparatus 100 without decoding a reference index, in decoding field t2.

For example, when two reference picture lists L0 and L1 are used as shown in FIG. 8, encoder 110 in moving picture encoding apparatus 100 encodes, for each block, information indicating a block type which indicates what prediction method is used for the block. A block type is information indicating, for instance, whether intra prediction is performed, inter prediction is performed using reference picture list L0, or inter prediction is performed using reference picture list L1. Even if only one reference picture list L0 is used as illustrated in FIG. 6, substantially the same information indicating a block type is encoded for each block. Thus, the amount of encodes for information indicating a reference picture list used for encoding each block does not show a significant difference depending on whether one reference list is used or two reference lists are used.

Accordingly, in encoding field t2, moving picture encoding apparatus 100 can, for each block, switch between same parity field t0 and opposite parity field b1 and refer to one of the fields, while avoiding an increase in the amount of encodes.

Only one field is assigned to each of reference picture lists L0 and L1. Accordingly, a control circuit for assigning fields can be simplified. In particular, even a circuit which allows addition of only one picture to reference picture list L0 or L1 can switch, for each block, the reference destination between a same parity field and an opposite parity field.

Note that in the example in FIG. 8, when field b5 is to be encoded, reference picture list L0 which includes only field b3 in the same parity as field b5, and reference picture list L1 which includes only field t4 in the opposite parity to field b5 are used. Reference index 0 is assigned to field b3 included in reference picture list L0, and also to field t4 included in reference picture list L1.

Moving picture encoding apparatus 100 can switch reference destinations between field b3 and field t4, and can encode field b5. Moving picture encoding apparatus 100 can encode field b3 and field t4 in the same manner as field t2 and field b5.

In FIG. 8, there is no referable field which is in the same parity as field b1 and located forward relative to field b1 in display order. Accordingly, moving picture encoding apparatus 100 may encode field b1 as a B-picture, using reference picture lists L0 and L1 each includes only opposite parity field t0. Alternatively, moving picture encoding apparatus 100 may encode field b1 as a P-picture, using reference picture list L0 which includes only field t0.

In other words, if a same parity field and an opposite parity field are referable, a current field may be encoded using reference picture list L0 which includes only a same parity field and reference picture list L1 which includes only an opposite parity field.

In the above description, reference picture lists L0 and L1 each include only one field, and thus reference index 0 assigned to the one field is not encoded. However, not only when reference index 0 is not encoded, but also when reference index 0 is encoded, similar advantageous effects can be obtained if the amount of encodes for reference index 0 is less than the amount of encodes for reference index 1.

Figure 9:
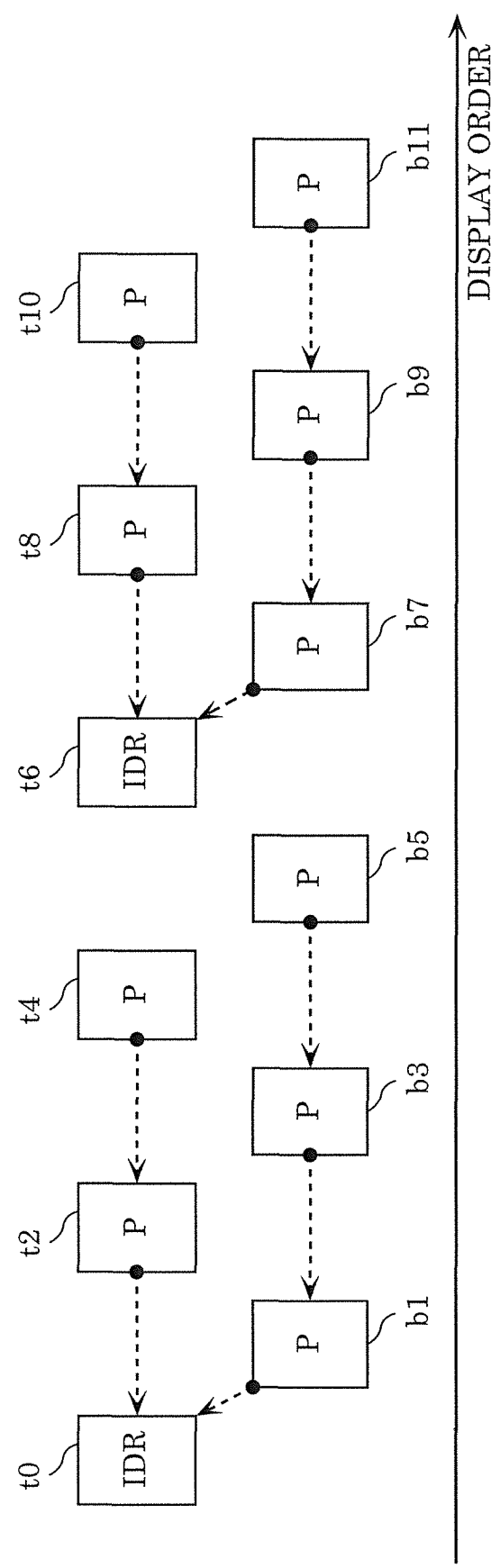
FIG. 9 is a conceptual diagram illustrating reference relationships between fields in a third reference example.

FIG. 9 is a conceptual diagram illustrating reference relationships between fields in a third reference example. FIG. 9 illustrates fields t0, b1, t2, b3, t4, b5, t6, b7, t8, b9, t10, and b11 in display order (input order). In this example, the coding order is the same as display order. Fields t0, t2, t4, t6, t8, and t10 in the upper row belong to the top field, and fields b1, b3, b5, b7, b9, and b11 in the lower row belong to a bottom field. The dotted line arrows each indicate from which field t0 which field reference is made.

In FIG. 9, each field is encoded as an IDR picture or a P-picture. An IDR picture is a type of an I-picture. Reference from a picture located backward relative to the IDR picture in coding order to a picture located forward relative to the IDR picture in coding order is prohibited.

In FIG. 9, when a current field is encoded as a P-picture, a forward same parity field is referred to, if referable. Here, a forward same parity field is in the same parity as the current field and located forward relative to the current field in display order. If a plurality of forward same parity fields are referable, a forward same parity field located closest to the current field in display order is referred to, among the plurality of referable forward same parity fields.

In this manner, a region of a moving picture in which no motion is present is encoded efficiently. However, a region of a moving picture in which motion is present may not be encoded efficiently.

Figure 10:
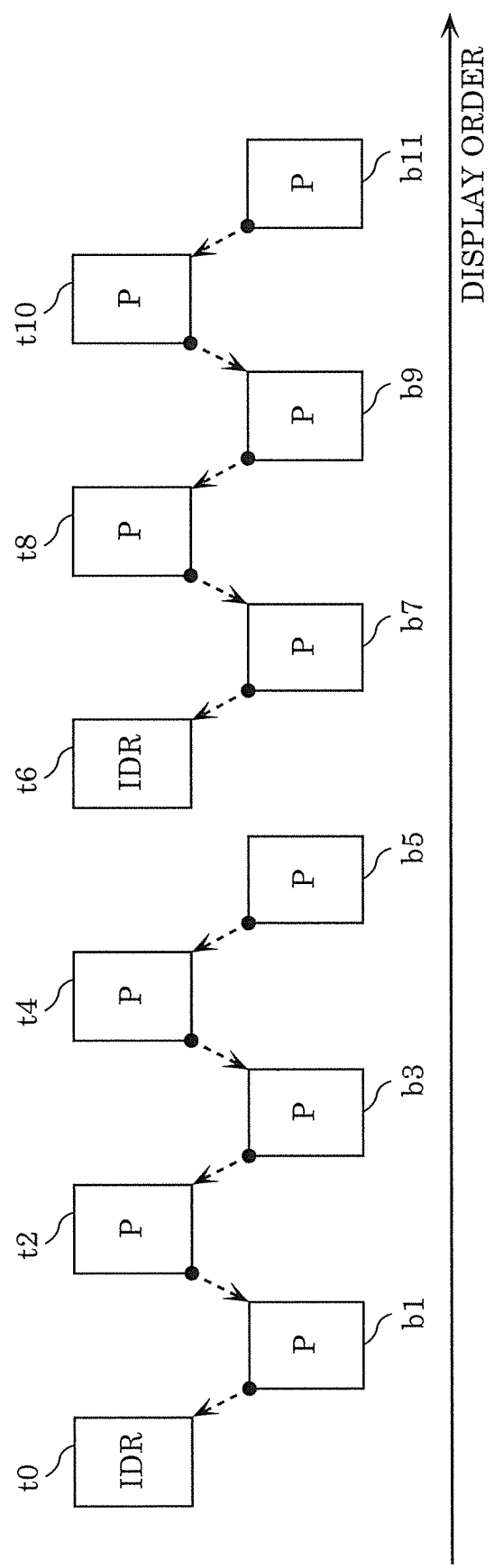
FIG. 10 is a conceptual diagram illustrating reference relationships between fields in a fourth reference example.

FIG. 10 is a conceptual diagram illustrating reference relationships between fields in a fourth reference example. FIG. 10 illustrates fields t0, b1, t2, b3, t4, b5, t6, b7, t8, b9, t10, and b11 in display order (input order), as with FIG. 9. In this example, coding order is the same as display order. Fields t0, t2, t4, t6, t8, and t10 in the upper row belong to the top field, and fields b1, b3, b5, b7, b9, and b11 in the lower row belong to the bottom field. The dotted line arrows each indicate from which field t0 which field reference is made.

As with FIG. 9, each field is encoded as an IDR picture or a P-picture.

In FIG. 10, a forward opposite parity field is referred to if referable, when a current field is encoded as a P-picture. Here, a forward opposite parity field is in an opposite parity to the current field and located forward relative to the current field in display order. If a plurality of forward opposite parity fields are referable, a forward opposite parity field located closest to the current field in display order is referred to, among the plurality of referable forward opposite parity fields.

In this manner, a region of a moving picture in which motion is present is encoded efficiently. However, a region of the moving picture in which no motion is present may not be encoded efficiently.

Figure 11:
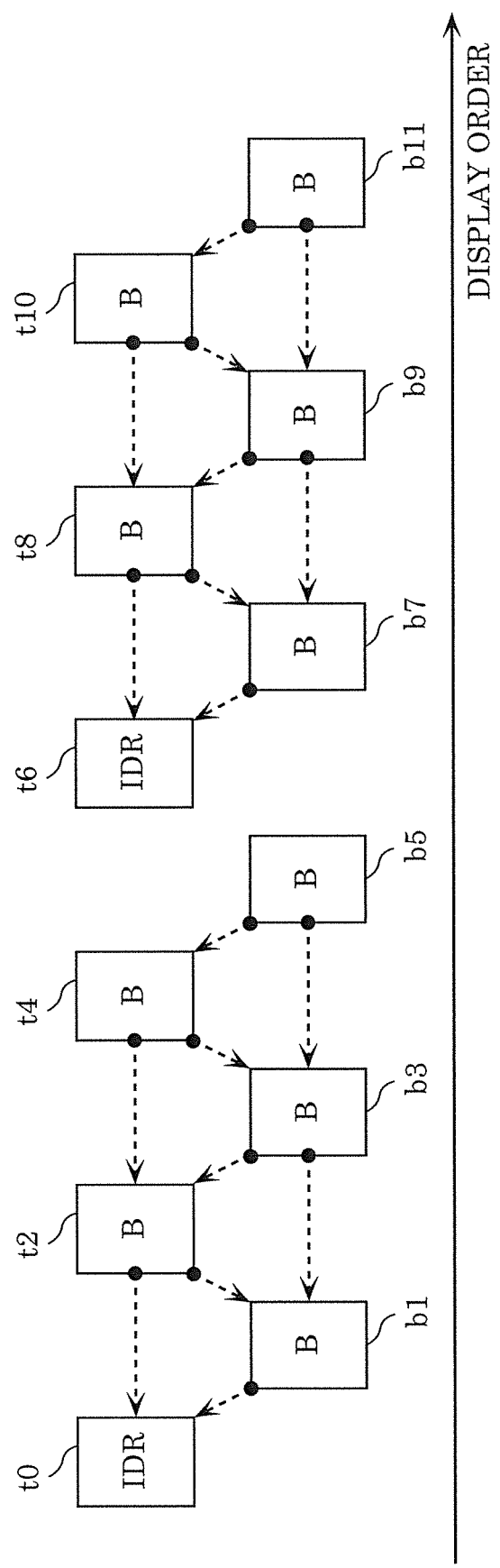
FIG. 11 is a conceptual diagram illustrating examples of reference relationships between fields according to Embodiment 1.

FIG. 11 is a conceptual diagram illustrating examples of reference relationships between the fields, which are used by moving picture encoding apparatus 100 illustrated in FIG. 1

FIG. 11 illustrates fields t0, b1, t2, b3, t4, b5, t6, b7, t8, b9, t10, and b11 in display order (input order), as with FIGS. 9 and 10. In this example, the coding order is the same as display order. Fields t0, t2, t4, t6, t8, and t10 in the upper row belong to the top field, and fields IA, b3, b5, b7, b9, and b11 in the lower row belong to the bottom field. The dotted line arrows each indicate from which field t0 which field reference is made.

In this example, each field is encoded as an IDR picture or a B-picture. When a current field is encoded as a B-picture, among one or more referable forward same parity fields, a forward same parity field located closest to the current field is added to reference picture list L0. Among one or more referable forward opposite parity fields, a forward opposite parity field located closest to the current field is added to reference picture list L1.

Encoder 110 of moving picture encoding apparatus 100 encodes a current field as a B-picture, using reference picture list L0 which includes only one forward same parity field and reference picture list L1 which includes only one forward opposite parity field. For example, encoder 110 refers to, for each block, a forward same parity field for a region of a current field t0 be encoded in which no motion is present, and refers to, for each block, a forward opposite parity field for a region of the current field in which motion is present, thus encoding the current field.

In this manner, moving picture encoding apparatus 100 can efficiently encode both a region in which no motion is present and a region in which motion is present in a moving picture.

Note that when field b1 is to be encoded, no referable forward same parity field is present. Accordingly, moving picture encoding apparatus 100 may encode field b1 as a B-picture, using reference picture lists L0 and L1 each of which includes only opposite parity field t0. Alternatively, moving picture encoding apparatus 100 may encode field b1 as a P-picture, using reference picture list L0 which includes only field t0. Moving picture encoding apparatus 100 encodes field b7 in the same manner as field M.

Figure 12:
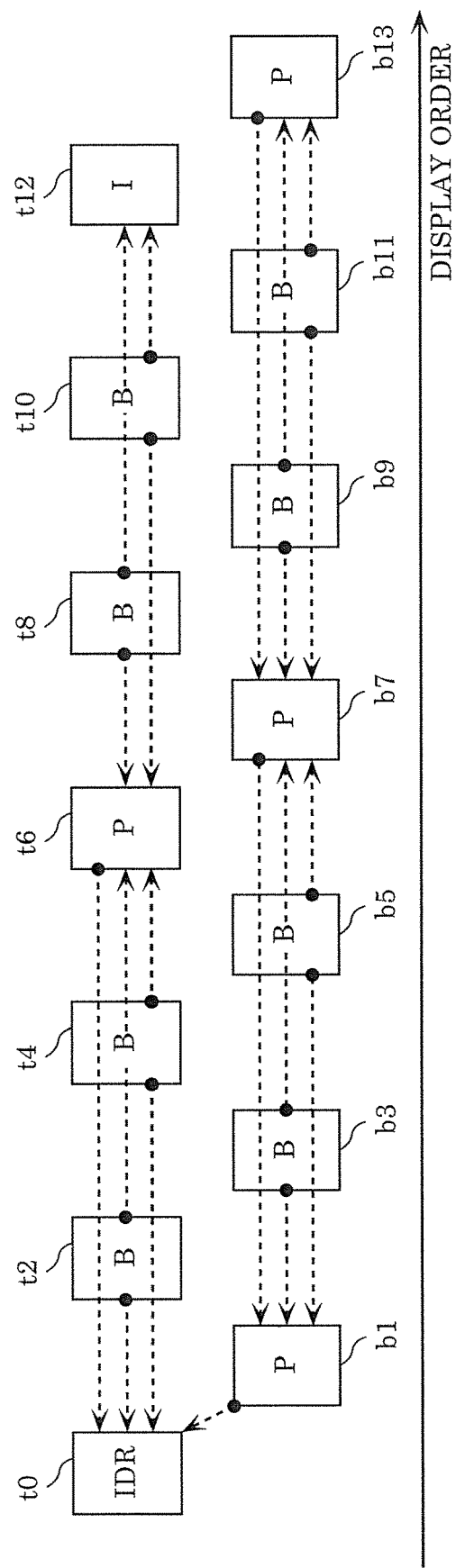
FIG. 12 is a conceptual diagram illustrating reference relationships between fields in a fifth reference example.

FIG. 12 is a conceptual diagram illustrating reference relationships between fields in a fifth reference example. FIG. 12 illustrates fields t0, b1, t2, b3, t4, b5, t6, b7, t8, b9, t10, b11, t12, and b13 in display order (input order). The coding order is the order in which t0, b1, t6, b7, t12, b13, t2, b3, t4, b5, t8, b9, t10, and b11 are encoded, for example.

Fields t0, t2, t4, t6, t8, t10, and t12 in the upper row belong to the top field, and fields b1, b3, b5, b7, b9, b11, and b13 in the lower row belong to the bottom field. The dotted line arrows each indicate from which field t0 which field reference is made.

Field t0 is encoded as an IDR picture, and field t12 is encoded as an I-picture. Fields b1, t6, b7, and b13 are encoded as P-pictures. Fields t2, b3, t4, b5, t8, b9, t10, and b11 are encoded as B-pictures.

When a current field is encoded as a P-picture, a forward same parity field is referred to if referable. If a plurality of forward same parity fields are referable, a forward same parity field located closest to the current field in display order is referred to, among the plurality of referable forward same parity fields.

In this manner, a region of a moving picture in which no motion is present is encoded efficiently. However, a region of the moving picture in which motion is present may not be encoded efficiently.

Figure 13:
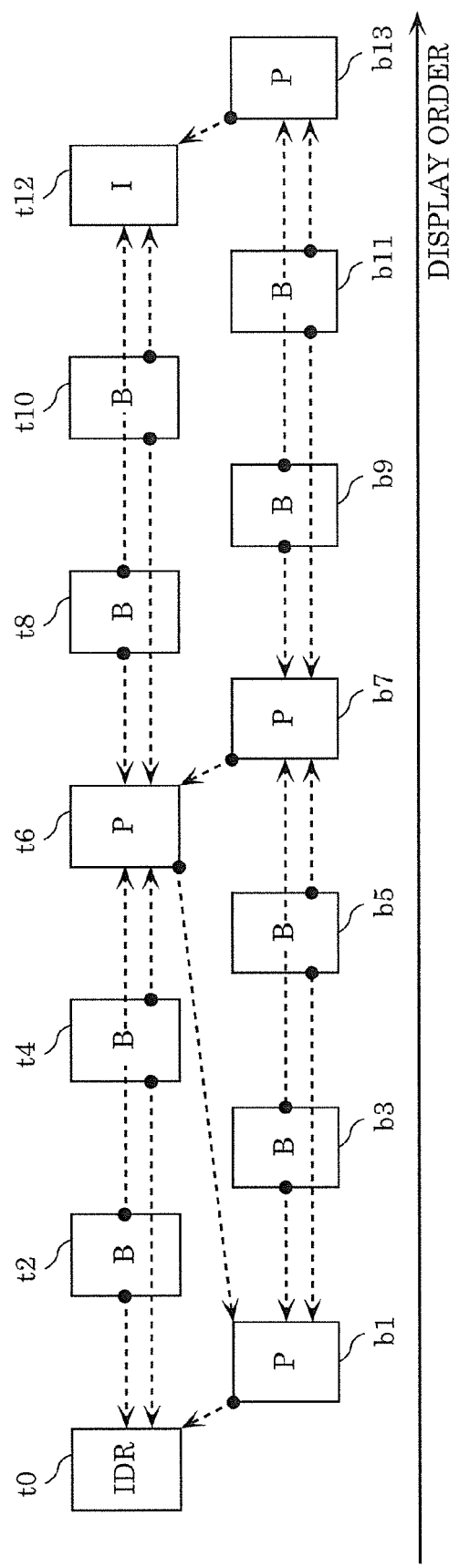
FIG. 13 is a conceptual diagram illustrating reference relationships between fields in a sixth reference example.

FIG. 13 is a conceptual diagram illustrating reference relationships between fields in a sixth reference example. FIG. 13 illustrates fields t0, b1, t2, b3, t4, b5, t6, b7, t8, b9, t10, b11, t12, and b13 in display order (input order), as with FIG. 12. The coding order is the order in which t0, b1, t6, b7, t12, b13, t2, b3, t4, b5, t8, b9, t10, and b11 are encoded, for example.

As with FIG. 12, fields t0, t2, t4, t6, t8, t10, and t12 in the upper row belong to the top field, and fields b1, b3, b5, b7, b9, b11, and b13 in the lower row belong to the bottom field. The dotted line arrows each indicate from which field t0 which field reference is made.

As with FIG. 12, field t0 is encoded as an IDR picture, and field t12 is encoded as an I-picture. Fields b1, t6, b7, and b13 are encoded as P-pictures. Fields t2, b3, t4, b5, t8, b9, t10, and b11 are encoded as B-pictures.

In FIG. 13, when a current field is encoded as a P-picture, a forward opposite parity field is referred to, if referable. If a plurality of forward opposite parity fields are referable, a forward opposite parity field located closest to the current field in display order is referred to, among the plurality of referable forward opposite parity fields.

In this manner, a region of a moving picture in which motion is present is encoded efficiently. However, a region of the moving picture in which no motion is present may not be encoded efficiently.

Figure 14:
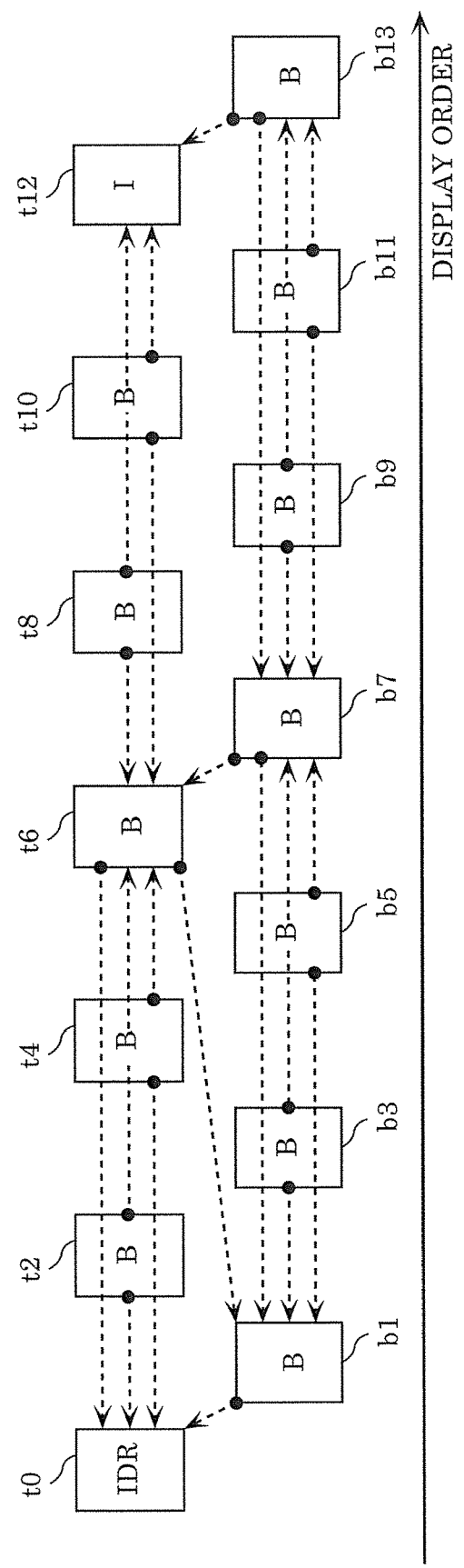
FIG. 14 is a conceptual diagram illustrating examples of reference relationships between fields according to Embodiment 1.

FIG. 14 is a conceptual diagram illustrating examples of reference relationships between fields, which are used by moving picture encoding apparatus 100 illustrated in FIG. 1. FIG. 14 illustrates fields t0, b1, t2, b3, t4, b5, t6, b7, t8, b9, t10, b11, t12, and b13 in display order (input order) as with FIGS. 12 and 13. The coding order is the order in which t0, b1, t6, b7, t12, b13, t2, b3, t4, b5, t8, b9, t10, and b11 are encoded, for example.

As with FIGS. 12 and 13, fields t0, t2, t4, t6, t8, t10, and t12 in the upper row belong to the top field, and fields b1, b3, b5, b7, b9, b11, and b13 in the lower row belong to the bottom field. The dotted line arrows each indicate from which field t0 which field reference is made.

As with FIGS. 12 and 13, field t0 is encoded as an IDR picture, field t12 is encoded as an I-picture, and fields t2, b3, t4, b5, t8, b9, t10, and b11 are encoded as B-pictures. In the examples in FIG. 14, fields b1, t6, b7, and b13 are also encoded as B-pictures.

In particular, when fields t6, b7, and b13 are each encoded as a current field, among one or more referable forward same parity fields, a forward same parity field located closest to the current field is added to reference picture list L0. Among one or more referable forward opposite parity fields, a forward opposite parity field located closest to the current field is added to reference picture list L1.

Encoder 110 of moving picture encoding apparatus 100 encodes the current field as a B-picture, using reference picture list L0 which includes only one forward same parity field, and reference picture list L1 which includes only one forward opposite parity field. For example, encoder 110 refers to, for each block, a forward same parity field, for a region of a current field t0 be encoded in which no motion is present, and refers to, for each block, a forward opposite parity field for a region of the current field in which motion is present, thus encoding the current field.

In this manner, moving picture encoding apparatus 100 can efficiently encode both a region in which no motion is present and a region in which motion is present in a moving picture.

Note that when field b1 is to be encoded, no referable forward same parity field is present. Thus, moving picture encoding apparatus 100 may encode field b1 as a B-picture, using reference picture lists L0 and L1 each of which includes only opposite parity field t0. Alternatively, moving picture encoding apparatus 100 may encode field b1 as a P-picture, using reference picture list L0 which includes only field t0.

Figure 15:
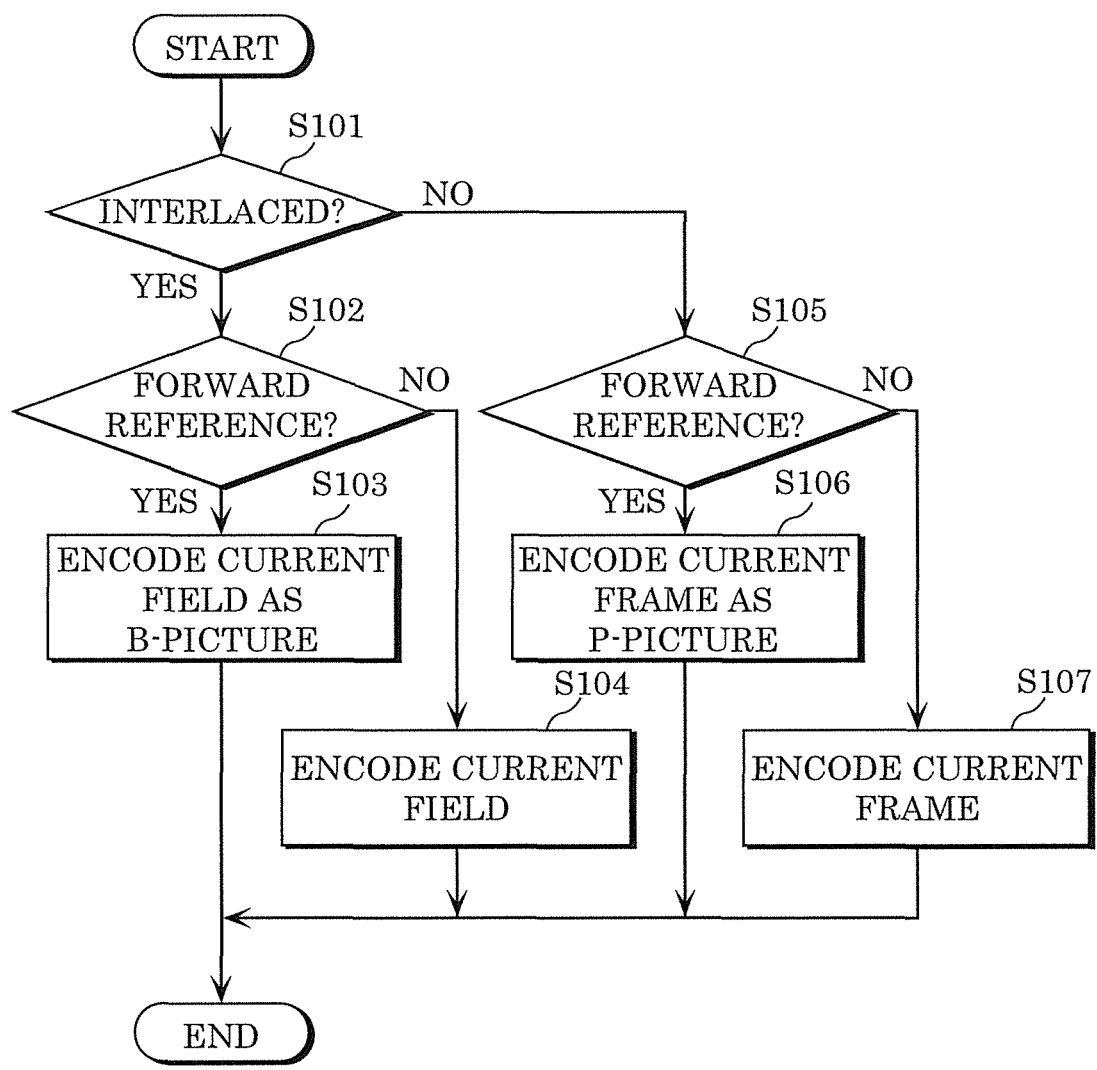
FIG. 15 is a flowchart illustrating operation of the moving picture encoding apparatus according to Embodiment 1.

FIG. 15 is a flowchart illustrating operation of moving picture encoding apparatus 100 illustrated in FIG. 1. For example, when encoding a current field included in a moving picture having an interlaced structure by forward reference, moving picture encoding apparatus 100 encodes the current field not as a P-picture, but as a B-picture. The following describes specific operation of moving picture encoding apparatus 100.

First, encoder 110 determines whether the structure of a moving picture is the interlaced structure or the progressive structure (S101). For example, encoder 110 may determine whether the structure of a moving picture is the interlaced structure or the progressive structure, in accordance with the indication from the outside. Alternatively, a moving picture may include information indicating either the interlaced structure or the progressive structure, and based on the information included in the moving picture, encoder 110 may determine whether the structure of the moving picture is the interlaced structure or the progressive structure.

If the structure of the moving picture is the interlaced structure (YES in S101), encoder 110 determines whether to encode a current field by forward reference (S102). Encoder 110 may determine whether to encode the current field by forward reference, based on a GOP, display order (input order), or a combination thereof. For example, encoder 110 may periodically determine that a current field is to be encoded by forward reference.

Note that the above forward reference means that a field is encoded using inter prediction, and a forward field in display order is referred to, rather than referring to a backward field in display order.

Encoder 110 encodes the current field as a B-picture if encoder 110 encodes the current field by forward reference (YES in S102) (S103). Specifically, in this case, encoder 110 encodes the current field as a B-picture, using reference picture list L0 which includes only one forward same parity field, and reference picture list L1 which includes only one forward opposite parity field.

On the other hand, if encoder 110 does not encode the current field by forward reference (NO in S102), encoder 110 encodes the current field using another method (S104). For example, encoder 110 may encode the current field as an I-picture. Alternatively, using a method including backward reference, encoder 110 may encode the current field as a P-picture or a B-picture.

If the structure of a moving picture is progressive structure (NO in S101), encoder 110 determines whether to encode a current frame by forward reference (S105). Based on a GOP, display order (input order), or a combination thereof, encoder 110 may determine whether to encode the current frame by forward reference. For example, encoder 110 may periodically determine that the current frame is to be encoded by forward reference.

Note that the above forward reference means that a frame is encoded using inter prediction, and a forward frame in display order is referred to, rather than referring to a backward frame in display order.

If encoder 110 encodes the current frame by forward reference (YES in S105), encoder 110 encodes the current frame as a P-picture (5106). Specifically, in this case, encoder 110 encodes the current frame as a P-picture, using reference picture list L0 which includes only one frame located forward in display order relative to the current frame.

If encoder 110 does not encode the current frame by forward reference (NO in S105), encoder 110 encodes the current frame using another method (S107). For example, encoder 110 may encode the current frame as an I-picture. Alternatively, encoder 110 may encode the current frame as a P-picture or a B-picture, using a method including backward reference.

By the above operation, if a current field included in a moving picture having the interlaced structure is to be encoded by forward reference, moving picture encoding apparatus 100 encodes the current field as a B-picture. In this case, moving picture encoding apparatus 100 uses reference picture list L0 which includes only one forward same parity field and reference picture list L1 which includes only one forward opposite parity field.

In this manner, while inhibiting an increase in the amount of encodes, moving picture encoding apparatus 100 can switch, for each block, a reference destination between a same parity field and an opposite parity field, and can encode the current field. In other words, moving picture encoding apparatus 100 can efficiently encode a moving picture having the interlaced structure.

If moving picture encoding apparatus 100 encodes a current frame included in a moving picture having the progressive structure by forward reference, moving picture encoding apparatus 100 encodes the current frame as a P-picture. In this case, moving picture encoding apparatus 100 uses reference picture list L0 which includes only one frame located forward in display order relative to the current frame.

In this manner, moving picture encoding apparatus 100 can encode the current frame with reference to a forward frame, while inhibiting an increase in the amount of encodes. In other words, moving picture encoding apparatus 100 can efficiently encode a moving picture having the progressive structure.

Note that in the above description, reference picture list L0 includes a field in the same parity as a current field t0 be encoded, and reference picture list L1 includes a field in the opposite parity to the current field. However, reference picture list L1 may include a field in the same parity as the current field, and reference picture list L0 may include a field in the opposite parity to the current field. In other words, L0 and L1 may be switched.

In the above description, whether a field/frame is referable may correspond to whether reference is permitted or may correspond to whether storage 120 stores the field/frame.

Moving picture encoding apparatus 100 may refer to both a field in the same parity as a current field t0 be encoded and a field in the opposite parity to the current field, when encoding one block in the current field. In other words, bi-prediction may be used. For example, moving picture encoding apparatus 100 may encode a block which lies over a boundary between a region in which motion is present and a region in which no motion is present, by referring to both a field in the same parity as the current field and a field in the opposite parity to the current field.

Among the two fields included in two reference picture lists L0 and L1, if one of the fields is in the same parity as a current field t0 be encoded and the other field is in the opposite parity to the current field, one or both of such two fields may be located backward in display order relative to the current field.

[1-3. Advantageous Effects and Others]

As described above, in the present embodiment, moving picture encoding apparatus 100 encodes a moving picture having the interlaced structure. Moving picture encoding apparatus 100 includes encoder 110 and storage 120. Storage 120 stores fields as reference pictures.

Encoder 110 encodes a current field as a B-picture using the first reference picture list and the second reference picture list. The first reference picture list includes, among the plurality of fields stored in storage 120, only one field in the same parity as the current field. The second reference picture list includes, among the plurality of fields stored in storage 120, only one field in the opposite parity to the current field.

In this manner, when encoding a current field included in a moving picture having the interlaced structure, moving picture encoding apparatus 100 can switch, for each block, between a same parity field and an opposite parity field, and refer to one of the fields, while preventing an increase in the amount of encodes. Specifically, moving picture encoding apparatus 100 can efficiently encode a moving picture having the interlaced structure.

For example, the one field included in the first reference picture list and the one field included in the second reference picture list are two fields located forward in display order relative to the current field.

In this manner, moving picture encoding apparatus 100 can switch, for each block, between the two fields located forward relative to the current field and refer to one of the fields, while preventing an increase in the amount of encodes, in encoding the current field. Accordingly, moving picture encoding apparatus 100 can refer to the two fields efficiently.

For example, the one field included in the first reference picture list is located closest to the current field in display order, among one or more referable forward same parity fields included in the plurality of fields stored in storage 120. The one field included in the second reference picture list is located closest to the current field in display order, among one or more referable forward opposite parity fields included in the plurality of fields stored in storage 120.

Here, the one or more forward same parity fields are in the same parity as the current field and located forward relative to the current field in display order, among the plurality of fields stored in storage 120. The one or more forward opposite parity fields are in the opposite parity to the current field and located forward relative to the current field in display order, among the plurality of fields stored in storage 120.

In this manner, while preventing an increase in the amount of encodes in encoding a current field, moving picture encoding apparatus 100 can switch, for each block, between two forward fields close to the current field and refer to one of the fields. Accordingly, moving picture encoding apparatus 100 can efficiently refer to the two fields, and improve prediction accuracy.

For example, moving picture encoding apparatus 100 further encodes a moving picture having the progressive structure. In encoding a moving picture having the interlaced structure, encoder 110 encodes a current field as a B-picture, when the current field is encoded using only forward reference. In encoding a moving picture having the progressive structure, encoder 110 encodes a current frame as a P-picture when encoder 110 is to encode the current frame using only forward reference.

In this manner, moving picture encoding apparatus 100 can appropriately determine the picture type of a picture encoded by forward reference, in accordance with whether a moving picture encoded is a moving picture having the interlaced structure or a moving picture having the progressive structure. Accordingly, moving picture encoding apparatus 100 can efficiently encode a moving picture having the interlaced structure and a moving picture having the progressive structure.

In the present embodiment, moving picture decoding apparatus 200 includes elements corresponding to the elements of moving picture encoding apparatus 100, and performs operation corresponding to the operation of moving picture encoding apparatus 100. For example, moving picture decoding apparatus 200 decodes a moving picture having the interlaced structure. Moving picture decoding apparatus 200 includes decoder 210 and storage 220. Storage 220 stores fields as reference pictures.

Decoder 210 decodes a current picture as a B-picture, using the first reference picture list and the second reference picture list. The first reference picture list includes only one field in the same parity as the current field, among the plurality of fields stored in storage 120. The second reference picture list includes only one field in the opposite parity to the current field among the plurality of fields stored in storage 120.

In this manner, moving picture decoding apparatus 200 can switch, for each block, between a field in the same parity as the current field and a field in the opposite parity to the current field, and refer to one of the fields in decoding the current field, as with moving picture encoding apparatus 100. Accordingly, moving picture decoding apparatus 200 can perform operation corresponding to the operation of moving picture encoding apparatus 100.

Note that among the first reference picture list and the second reference picture list, one is reference picture list L0, and the other is reference picture list L1. The first reference picture list can be either reference picture list L0 or reference picture list L1. The second reference picture list can be either reference picture list L0 or reference picture list L1.

If only one reference picture is included in a reference picture list, reference index 0 is assigned to the one reference picture included in the reference picture list. In this case, reference index 0 is not encoded for each block as a reference destination, and thus an increase in the amount of encodes is prevented.

AVC specifies a method of switching, for each block, between frame encoding suitable for encoding a region in which no motion is present and field encoding suitable for encoding a region in which motion is present. HEVC, however, does not specify a method of switching between frame encoding and field encoding for each block. Accordingly, moving picture encoding apparatus 100 which can encode efficiently a current field which includes a region in which no motion is present and a region in which motion is present is useful in particular to HEVC.

Other Embodiments

The above has described Embodiment 1 as an example of the technology disclosed in the present application. However, the technology according to the present disclosure is not limited to this, but can be suitably applied also to an embodiment to which change, replacement, addition, and an omission, for instance, have been made. It is also possible to achieve, as a new embodiment, a combination of elements described in Embodiment 1 above. Now, another embodiment is shown below.

For example, in Embodiment 1, encoder 110 includes subtractor 111, transformer 112, variable length encoder 113, inverse transformer 114, adder 115, and predictor 116. Decoder 210 includes variable length decoder 213, inverse transformer 214, adder 215, and predictor 216. However, these elements are examples and change, replacement, addition, and omission, for instance, may be made to these elements as appropriate.

Encoder 110 may be represented as an encoding unit, and decoder 210 may be represented as a decoding unit. Storages 120 and 220 may be each represented as a storing unit, a buffer, a memory, a reference picture buffer, or a reference picture memory, for instance.

Moving picture encoding apparatus 100 and moving picture decoding apparatus 200 each may selectively include the elements according to the present disclosure, and the moving picture encoding method and the moving picture decoding method each may also include selectively the processes according to the present disclosure.

Each element according to the present disclosure may be a circuit. These circuits may constitute one circuit as a whole, or may be separate circuits. These circuits may be widely used circuits or dedicated circuits.

A computer may execute the processes in the present disclosure. For example, the computer executes the processes according to the present disclosure, by executing a program using hardware resources such as a processor (CPU), a memory, and an input output circuit. Specifically, the computer executes the processes by the processor obtaining data to be processed from the memory or the input output circuit and calculating the data, and outputting the result of the calculation to the memory or the input output circuit.

A program for executing the processes in the present disclosure may be stored in a non-transitory computer-readable recording media such as a CD-ROM. In this case, a computer reads a program from the non-transitory recording medium and executes the program, thus executing the processes.

Furthermore, moving picture encoding apparatus 100 illustrated in Embodiment 1 may be applied to various apparatuses. The following describes examples of application of moving picture encoding apparatus 100, with reference to FIGS. 16 to 18.

Figure 16:
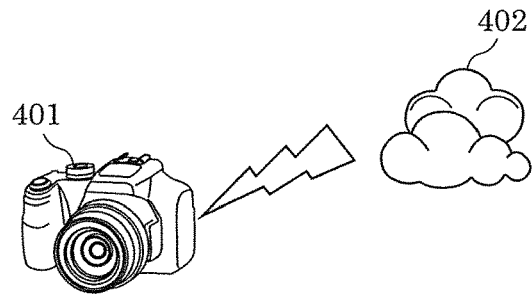
FIG. 16 is a conceptual diagram illustrating an example of a first application of the moving picture encoding apparatus according to Embodiment 1.

FIG. 16 is a conceptual diagram illustrating an example of a first application of moving picture encoding apparatus 100 illustrated in FIG. 1. Digital camera 401 and cloud system 402 are illustrated in FIG. 16. Digital camera 401 is an example of moving picture encoding apparatus 100. Digital camera 401 may include moving picture encoding apparatus 100.

Digital camera 401 encodes a moving picture having the interlaced structure in accordance with the procedure illustrated in Embodiment 1. Specifically, digital camera 401 encodes a current field as a B-picture, using a reference picture list which includes only one same parity field and a reference picture list which includes only one opposite parity field. Digital camera 401 transmits the encoded moving picture to cloud system 402, and stores the encoded moving picture in cloud system 402.

The procedure illustrated in Embodiment 1 is applied to encoding a moving picture having the interlaced structure, and thus the amount of encodes is reduced. Accordingly, the amount of transmission of data in communication is also reduced, and the amount of stored data is also reduced.

Figure 17:
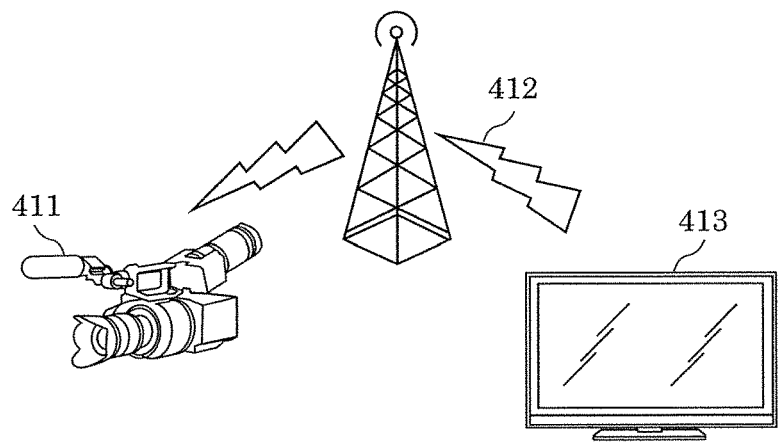
FIG. 17 is a conceptual diagram illustrating an example of a second application of the moving picture encoding apparatus according to Embodiment 1.

FIG. 17 is a conceptual diagram illustrating an example of a second application of moving picture encoding apparatus 100 illustrated in FIG. 1. Broadcast camera 411, broadcasting station 412, and TV 413 are illustrated in FIG. 17. Broadcast camera 411 is an example of moving picture encoding apparatus 100. Broadcast camera 411 may include moving picture encoding apparatus 100.

Broadcast camera 411 encodes a moving picture having the interlaced structure in accordance with the procedure illustrated in Embodiment 1. Specifically, broadcast camera 411 encodes a current field as a B-picture using a reference picture list which includes only one same parity field and a reference picture list which includes only one opposite parity field. The encoded moving picture is transmitted from broadcast camera 411 to broadcasting station 412, and then is transmitted from broadcasting station 412 to TV 413.

In encoding a moving picture having the interlaced structure, the application of the procedure illustrated in Embodiment 1 reduces the amount of encodes. Accordingly, the amount of transmitting data in broadcast is also reduced.

Figure 18:
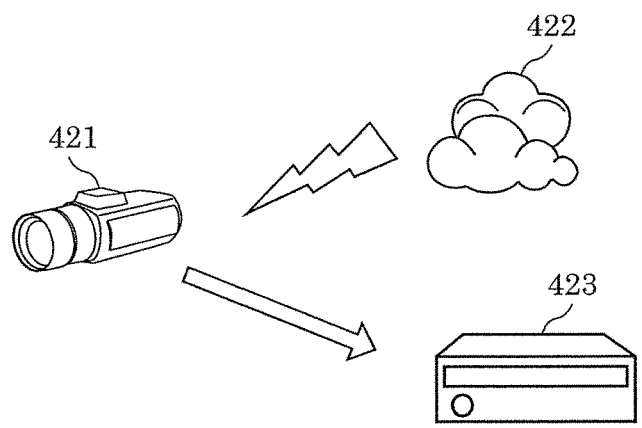
FIG. 18 is a conceptual diagram illustrating an example of a third application of the moving picture encoding apparatus according to Embodiment 1.

FIG. 18 is a conceptual diagram illustrating an example of a third application of moving picture encoding apparatus 100 illustrated in FIG. 1. Monitoring camera 421, cloud system 422, and video recorder 423 are illustrated in FIG. 18. Monitoring camera 421 is an example of moving picture encoding apparatus 100. Monitoring camera 421 may include moving picture encoding apparatus 100.

Monitoring camera 421 encodes a moving picture having the interlaced structure in accordance with the procedure illustrated in Embodiment 1. Specifically, monitoring camera 421 encodes a current field as a B-picture, using a reference picture list which includes only one same parity field and a reference picture list which includes only one opposite parity field.

Monitoring camera 421 transmits the encoded moving picture to cloud system 422 or video recorder 423, and thus stores the encoded moving picture in cloud system 422 or video recorder 423.

The procedure illustrated in Embodiment 1 in encoding a moving picture is applied, and thus the amount of encodes is reduced. Accordingly, the amount of transmission of data in communication is also reduced, and the amount of stored data is also reduced. A moving picture encoded by monitoring camera 421 basically includes a background region in which no motion is present. Accordingly, the application of the procedure illustrated by Embodiment 1 yields highly advantageous effects.

The above has described the embodiments as examples of the technology according to the present disclosure. For the description, the accompanying drawings and the detailed description are provided.

Thus, the elements illustrated in the accompanying drawings and described in the detailed description may include not only elements necessary for addressing the problem, but also elements not necessarily required for addressing the problem, in order to illustrate the above technology. Accordingly, a mere fact that such unnecessarily required elements are illustrated in the accompanying drawings and described in the detailed description should not immediately lead to a determination that such unnecessarily required elements are required.

In addition, the embodiments described above are intended to illustrate the technology according to the present disclosure, and thus various changes, replacement, addition, and omission, for instance, can be performed within the scope of claims and the equivalent thereof.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for instance, a moving picture encoding apparatus which encodes a moving picture. Specifically, the present disclosure is applicable to, for instance, digital video cameras, fixed point observation cameras, monitoring cameras, and security cameras.

What is claimed is:

1. A moving picture encoding apparatus which encodes a moving picture having an interlaced structure, the moving picture encoding apparatus comprising:
    a storage which stores fields as reference pictures; and
    an encoder which encodes a current field as a B-picture, using a first reference picture list which includes only one field in a same parity as the current field, and a second reference picture list which includes only one field in an opposite parity to the current field,
    wherein the one field included in the first reference picture list and the one field included in the second reference picture list are two fields located forward relative to the current field in display order.

2. The moving picture encoding apparatus according to claim 1, wherein
    the one field included in the first reference picture list is located closest to the current field in display order, in the same parity as the current field, and located forward relative to the current field in the display order, and
    the one field included in the second reference picture list is located closest to the current field in the display order, in the opposite parity to the current field, and located forward relative to the current field in the display order.

3. The moving picture encoding apparatus according to claim 1, which further encodes a moving picture having a progressive structure, wherein the encoder encodes the current field as a B-picture, when the encoder encodes the current field using only forward reference in encoding the moving picture having the interlaced structure, and the encoder encodes a current frame as a P-picture, when the encoder encodes the current frame using only forward reference in encoding the moving picture having the progressive structure.

4. A moving picture encoding method for encoding a moving picture having an interlaced structure, the moving picture encoding method comprising:

storing fields as reference pictures in a storage; and encoding a current field as a B-picture, using a first reference picture list which includes only one field in a same parity as the current field, and a second reference picture list which includes only one field in an opposite parity to the current field, wherein the one field included in the first reference picture list and the one field included in the second reference picture list are two fields located forward relative to the current field in display order.

* * * * *